United States Patent [19]

Pizzorno

[11] Patent Number: 4,682,940
[45] Date of Patent: Jul. 28, 1987

[54] DOUBLE-MOLDED VULCANIZING PRESS

[75] Inventor: Augusto Pizzorno, Milan, Italy

[73] Assignee: Pirelli Coordinamento Pneumatici S.p.A., Milan, Italy

[21] Appl. No.: 811,407

[22] Filed: Dec. 20, 1985

[30] Foreign Application Priority Data

Dec. 21, 1984 [IT] Italy .................. 24220 A/84

[51] Int. Cl.⁴ .......................................... B29C 35/02
[52] U.S. Cl. .................. 425/34 R; 264/326; 425/35; 425/390
[58] Field of Search .................. 425/34 R, 35, 38, 47, 425/195, 233, 390, 394, 395, 408, 443; 264/315, 326

[56] References Cited

U.S. PATENT DOCUMENTS

| | | | |
|---|---|---|---|
| 2,895,166 | 7/1959 | MacMillan | 425/47 X |
| 3,734,656 | 5/1973 | Balle | 425/34 R |
| 3,797,979 | 3/1974 | Greenwood | 425/47 |
| 3,918,861 | 11/1975 | Klose | 425/34 R X |
| 3,986,916 | 10/1976 | Marangoni | 425/34 R X |
| 4,076,473 | 2/1978 | MacMillan | 425/47 X |
| 4,484,874 | 11/1984 | Okawachi | 425/47 |
| 4,539,168 | 9/1985 | Brugger et al. | 425/443 X |

Primary Examiner—Richard L. Chiesa
Attorney, Agent, or Firm—Birch, Stewart, Kolasch & Birch

[57] ABSTRACT

A molding and/or vulcanizing press that is provided with two adjacent sites for containing two corresponding vulcanizing molds, each mold comprising at least two opposite sections, lower and upper sections respectively, that are reciprocally shiftable axially, defining a cavity inside which a product is molded and/or vulcanized, each section being mounted on corresponding tables. A device is provided for coupling the molds integral with a beam and a base and interposed respectively between the beam and an upper table and between the base and a lower table. The device is provided with coupling surfaces with corresponding matching surfaces provided on the tables for allowing each mold relative shifting between the closed and pressurized mold and a frame.

8 Claims, 7 Drawing Figures

DOUBLE-MOLDED VULCANIZING PRESS

BACKGROUND OF THE INVENTION

The present invention relates to a molding and/or vulcanizing press provided with a double-mold for molding or injecting materials, in particular elastomeric or plastomeric materials.

For preventing bad reciprocal coupling of the mold parts, which result from the deformation of the frame during the working cycles of the press, the present invention forsees coupling the mold parts with the supporting frame by means of pairs of matched surfaces, concave on the frames and convex on the molds, in particular cylindrical or spherical, such as to allow for relative shiftings to take place between the shut and pressurized molds and the frame.

The present invention concerns devices for molding as well as for injecting, and also for vulcanizing elastomeric or plastomeric articles. In particular, it refers to the vulcanizing presses that are provided with double-molds.

One type of such press that is by now well-known, is the one used in rubber technology and in particular, in tire technology, which is being widely used since it offers certain unquestioned advantages as with respect to those presses provided with a single-mold. In fact, with respect to these latter, the two-mold press has a double productivity, while the overall dimensions of the machine, its weight and its function are not equal twice that of the single-mold presses, so much so that further economic advantages are realized as far as regards the cost, and the consequent blocking of capital. Further savings can also be realized during operation, with regard to the usage of fluids and of energy in general, that are necessary for making the press function.

With respect to the single-mold presses, the double-mold presses however present a disadvantage that has a negative effect on the quality of the finished product which disadvantage has now become intollerable as a consequence of the high qualitative level obtained through the other systems and which seriously affect the actual possibilities of further developing machines.

The general architecture of a double-mold press consists of a frame comprising a base on which the two molds are arranged, a beam to which are connected the upper portions of the two molds and two shoulders that connect the extremities of the beam to the base by means of a kinematic connection (generally of the connecting rod-handle type) that allows for shifting the beam with respect to the base for opening and shutting the molds, for inserting the article to be molded and/or vulcanized and for removing the already molded or vulcanized article. Moreoever, this connection allows for keeping these molds shut during the molding and/or vulcanizing cycle.

As is already known, during the molding and vulcanizing of hollow articles such as, in particular, tires or injected articles, on the inside of the mold there acts a vulcanizingfluid pressure that is specifically introduced into the molds, or more precisely, in the article to be vulcanized, or the injection pressure of the material from which the article to be molded is comprised. This pressure tends to open the molds and hence, it must be resisted even before the entry of the fluid or the injected material into the mold, with a thrust exercised by the beam upon one portion of the mold against the other portion of the mold. If the beam is fixed at its extremities to the shoulders, and the thrust is applied onthe extremities for shutting the molds, while the molds exercise a pressure in the opposite sense at two intermediate points of the beam, then it can immediately be predicted that the beam bends more or less symmetrically with respect to its mid-plane between the two points of application for the counter-pressure of the molds. Owing to this flexing of the beam and hence of the consequent variation in the geometry of the machine, the two molds which have one portion made integral with the beam and the other portion made integral with the base of the press, present the two corresponding portions off-set one with respect to the other and hence, they result in being non-symmetrically loaded with regard to their axis and at times, they do not even keep completely shut, but each one tends to open-up in the zone overlooking the other mold. This phenomenon causes an unsymmetrical molding of the product and the formation of burrs that are more or less evident along a limited portion of the peripheral contour of the product and which compromise both its aspect as well as its qualitative standard.

It is evident that, in the single mold presses, the eventual bending of the beam however, is always centered in respect to the axis of the mold, which is why the machines are devoid of the above-described drawback.

The purpose of the present invention is to bring about certain improvements in the architecture of the double-mold presses so as to eliminate the above-mentioned defects and improve these machines and, in this manner, make available the undoubted advantages, previously discussed that they present.

SUMMARY OF THE INVENTION

Therefore, what constitutes an object of the present invention is a molding and/or vulcanizing press that is provided with two adjacent places for containing two corresponding vulcanizing molds, each mold comprising at least two opposite sections, a lower and an upper section respectively, that they reciprocally shift axially in both directions, delimiting a cavity inside in which the product is molded and vulcanized, with each section being mounted on a corresponding table, the press being constituted substantially of a frame comprising two housing seats for the lower tables, a beam to which the upper tables are fixed, two shoulders connecting the beam to the base through fixtures that allow forshifting the beam with respect to the base for so realizing at least the opening and the shutting of the molds and for exercising a thrust upon each pair of opposed sections, sufficient for keeping the molds closed by contrasting the pressure acting inside the molds during each working cycle. The press is characterized by the fact of comprising means for coupling with the molds, that are made integral with the beam and the base and interposed respectively between the beam and the upper table and between the base and the lower table, provided with coupling surfaces with corresponding matching surfaces provided on the tables, for allowing each mold to shift between the closed, pressurized mold and the frame. In particular, the relative shiftings include at least the rotation of each table with respect to the frame about an axis perpendicular to the axis of the mold and to the plane of symmetry of the press that passes through the shoulders.

Again, the coupling surfaces are preferably concave surfaces which intersect with the plane of symmetry as arcs of a circle having a line perpendicular to the cord, inclined with respect to the axis of the mold according to an angle between about 20° and 40°. Preferably, in correspondance with each table, the support means comprises a pair of longitudinal members mounted integrally with respect to each table and base, perpendicular to the plane of symmetry, symmetrically disposed with respect to the axis of the mold, provided with a concave surface for coupling with a corresponding convex surface provided on the table. In particular, the concave surface is preferably a cylindrical surface, having its generatrix parallel to the longitudinal direction of the longitudinal-member. According to a preferred form of execution, the intersection of cylindrical surfaces, made on each pair of longitudinal members in corresponding to the half-molds, with the plane of symmetry being constituted by two arcs of a circle forming part of the same circumference. The circumferences respectively below and above, relative to a single mold, have preferably the same center, but they do not necessarily have the same radius.

In a further convenient alternative variation of the machine of the invention, the coupling means comprise, for each table, a drum coaxial with the annular section, provided with a concave surface, constituting the inner surface of a spherical cap, that couples with a corresponding convex spherical cap provided on the table.

BRIEF DESCRIPTION OF DRAWINGS

The present invention will be better understood with the aid of the following description and the attached figures provided solely as a non-limiting example, wherein.

DETAILED DESCRIPTION

Figure 1:
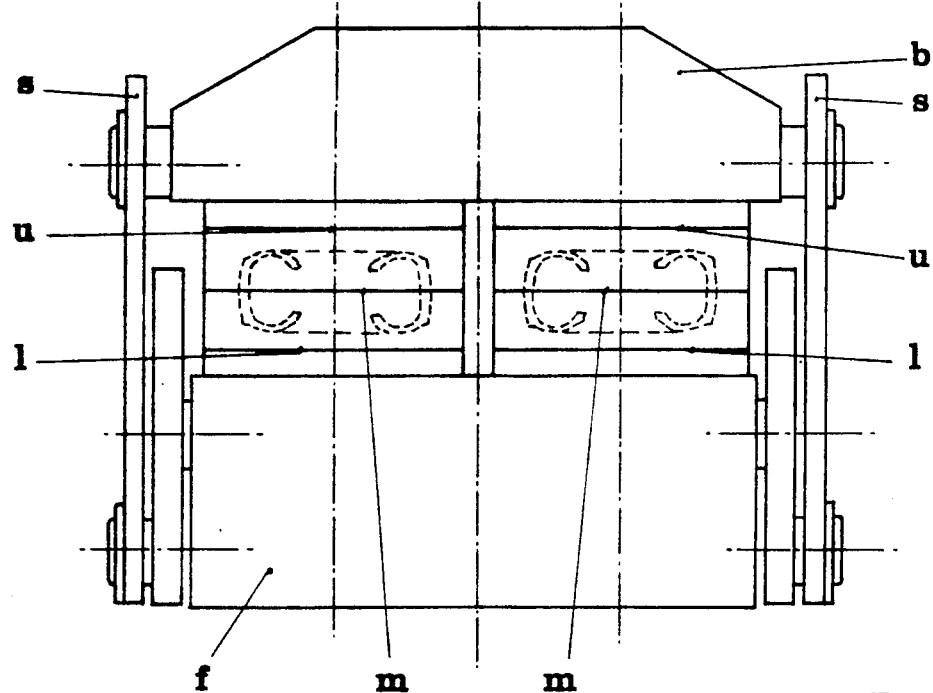
FIG. 1 shows a general view of the press assembly for vulcanizing tires, according to the invention.
Figure 2:
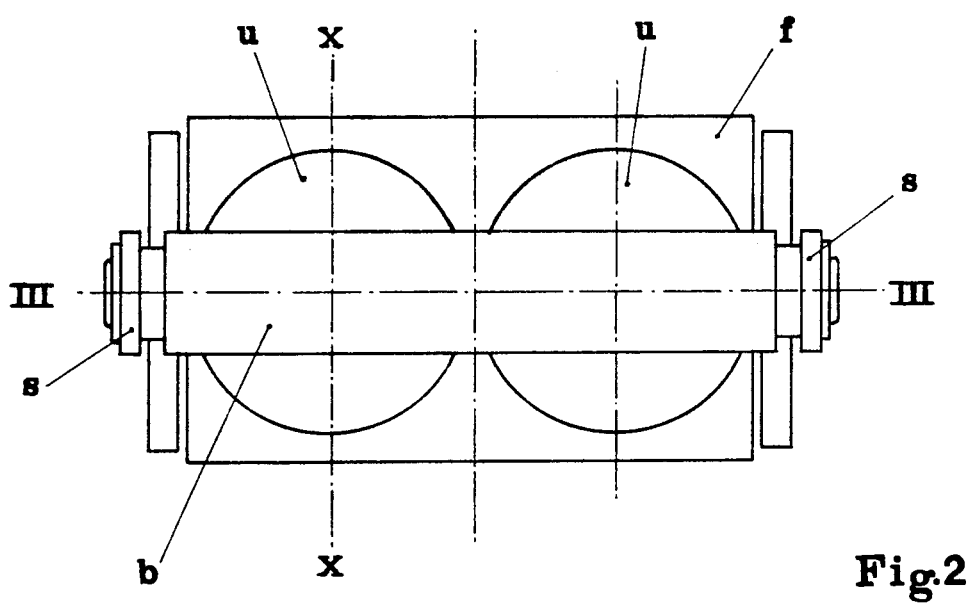
FIG. 2 shows a top-view of the machine of FIG. 1.

Therefore, FIG. 1 shows a view of the assembly of the machine according to the invention, wherein a base f on which are arranged, side-by-side to each other, two molds m, comprising a lower portion or bottom, fixed to the base, and an upper portion or cap u, fixed to a beam b, connected to the base f, through two shoulders s, in such a way as to realize between the beam and the base, a kinematic connection of the connecting-rod-handle type, that allows for opening and shutting of the molds and also for exercising on the covers of the molds, a thrust directed towards the base, that will keep the molds shut against the action of the vulcanizing fluid pressure, or of the molding pressure of the material, that is developed inside the molds. FIG. 2 shows the machine of FIG. 1 as seen from above.

Figure 3:
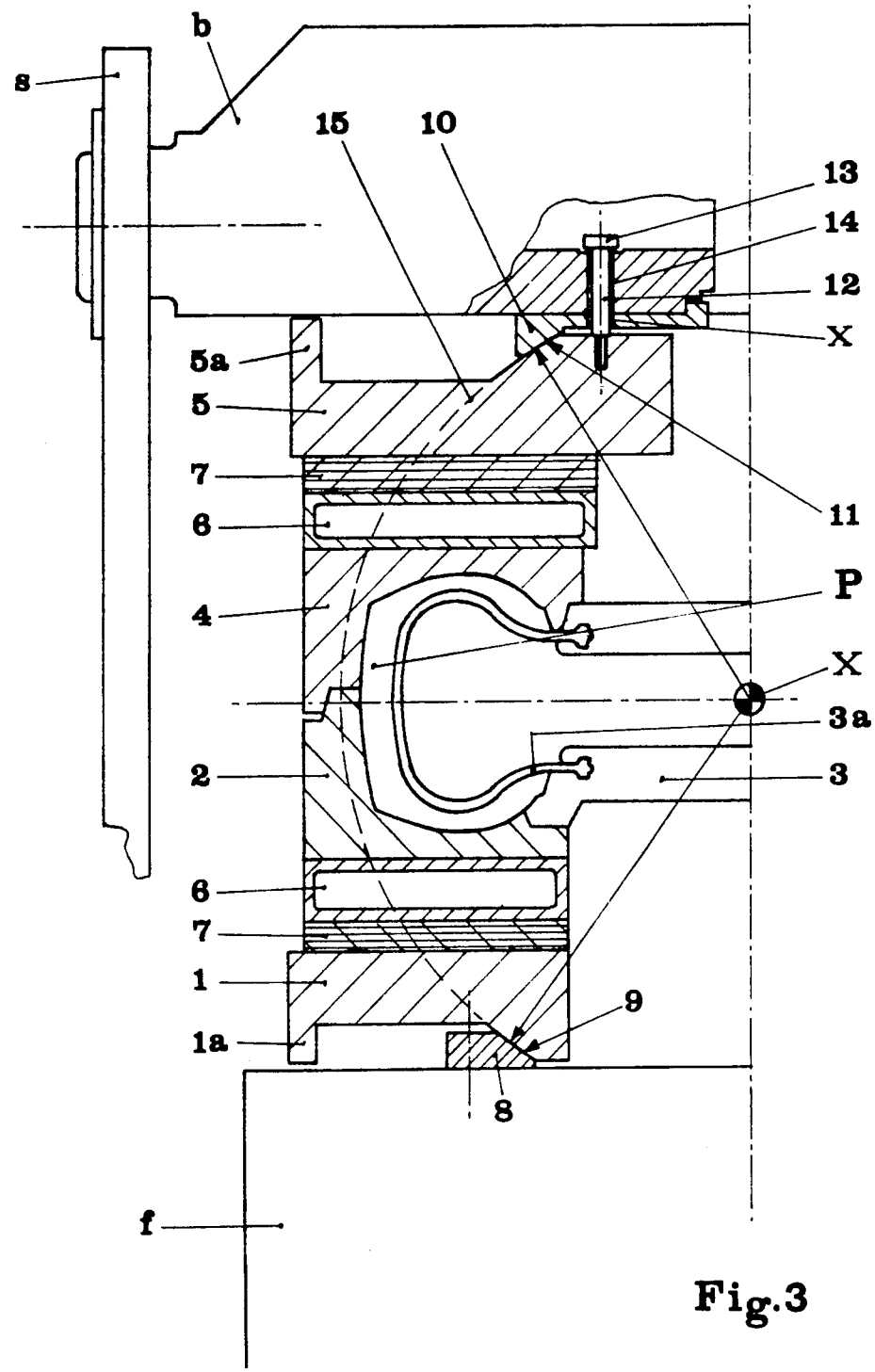
FIG. 3 shows in detail a vertical section of a portion of the machine of the invention.

FIG. 3 shows the configuration of the machine limited to a quarter of its lay-out, i.e. to the axial mid-plane of a single molding point. Hence, the machine comprises the base f connected through the shoulder s and a beam b in such a way as to render the beam mobile with respect to the base. The details of the kinematicism and of the various interactions between the elements of the press are well-known to the skilled artisan and need not be elaborately discussed.

On the base f there is arranged a table 1, on which there is mounted the lower section 2 of the vulcanizing mold. The mold shown and described is a two half-shell mold for vulcanizing tires. It will appear clear from the description given herebelow, that the mold can be of any standard type for manufacturing any molded or injected article whereas, for the sake of clarity of description, there has ben chosen the example of the mold for vulcanizing tires.

In particular, as far as tires are concerned the mold could also be the already well-known mold of the centripetal type comprised of two cheeks corresponding to the tire side-walls and by a circle of sectors that are radially shiftable, with respect to the cheeks, corresponding to the tread-band.

In the case illustrated, it should be noted that the central part of the mold is occupied by the actioning mechanism 3 of a vulcanizing chamber 3a, that is inserted into a raw tire p prior to its vulcanization and into which, during the molding and vulcanizing cycle, a vulcanizing-fluid having a high temperature and pressure is introduced.

The above tables support the heating elements 6, inside which the fluid (steam) is circulated at a high temperature for keeping the mold temperature within the prescribed limits, i.e. the elements 2 and 4 in being coupled with each other, define the cavity inside which the article to be produced is moulded and vulcanized.

According to the present invention, the two vulcanizing molds and hence also the tables on which the corresponding sections of the mold are fixed in an integral manner through the interpositioning of heat insulation elements 7, are made shiftable with respect to the press frame. In particular, the shifting is the result of the rotating of the tables about an axis intersecting the mold axis, perpendicular to the latter and to the plane of symmetry of the plane containing the mold axis and passing through the shoulders of the press. The marking-out of the plane, is indicated by the line III—III in FIG. 2, and it is evident that this plane coincides with the plane of the drawing in FIG. 3.

For the purpose of obtaining the above shifting of the tables upon the base of the press, there are fixed for each mold, two support elements 8, in particular two longitudinal members, disposed perpendicular to the plane of the drawing, provided with a concave surface 9, substantially oriented at 30° with respect to the axis of the mold. More precisely, the perpendicular to the chord of the circumference arc as originated by the intersection of each concave surface with the plane of symmetry III—III is inclined at an angle (w) of 30° with respect to the mold axis, which angle can however vary from between 20° to 40°. The lower table 1 rests upon the corresponding concave surface through a convex surface that is coupled with the concave surface. Of course, fixing means (not shown) can also be foreseen, that though ensuring the possibility of relative shifting between the table 1 and the base f, guarantees the assembly between the table and the base. Analogously to what has just been described, on beam b, in correspondence of each mold, there are fixed two support elements 10 in particular, two longitudinal members disposed perpendicular to the drawing plane, provided with a concave surface 11 oriented approximately at 30° with respect to the mold-axis, in an entirely similar way to that which has just been defined above. The bending radius to the concave (convex) surfaces, has a value that is very similar to that of the tire to be vulcanized.

The upper table couples with the above-mentioned supports through two convex surfaces, coupled with the concave surfaces 11. Since the table 5 is now freely shiftable with respect to the beam, the fixture between the table and the beam, that must allow for opening the mold through the action of the beam, is realized through a series of screws 12, provided with a blocking head 13 and inserted into a hole 14 having a greater diameter than that of the body of the screw 12. These screws are connected to the beam by their upper extremity and fixed, in an integral way, to the table 5 by their other extremity. The head 13, in interfering with the beam body, prevents any detaching from occurring between the beam and the upper table.

The relative shifting of the table with respect to the beam causes an off-setting of the screw with respect to the beam, the off-setting being made possible by the above-cited greater width of the hole 14 with respect to the body of the screw 12. For limiting these off-settings, the table 5 is conveniently provided with a tooth 5a that, after a rotation between table 5 and beam b, at a certain point interferes with the lower surface of the beam thereby preventing any further rotation in the same direction. A similar tooth 1a, is provided on the table 1, for interfering with the base f. Preferably, the concave and convex surfaces described above are portions of coaxial cylindrical surfaces whose generatrices, i.e. the lines parallel to the cylinder axis and lying on the surface of the cylinder itself, are parallel to the longitudinal direction of the longitudinal-members, i.e. perpendicular to the above-cited plane of symmetry III—III and hence, perpendicular to the drawing plane of FIG. 3. Moreoever and preferably, the above-cylindrical surfaces concave and convex, constitute portions of the same cylindrical surface, indicated with a broken-line 15 in FIG. 3, whose axis X—X lies on the equatorial plane of the mold, while cutting into the axis of the above-mentioned mold.

Figure 6:
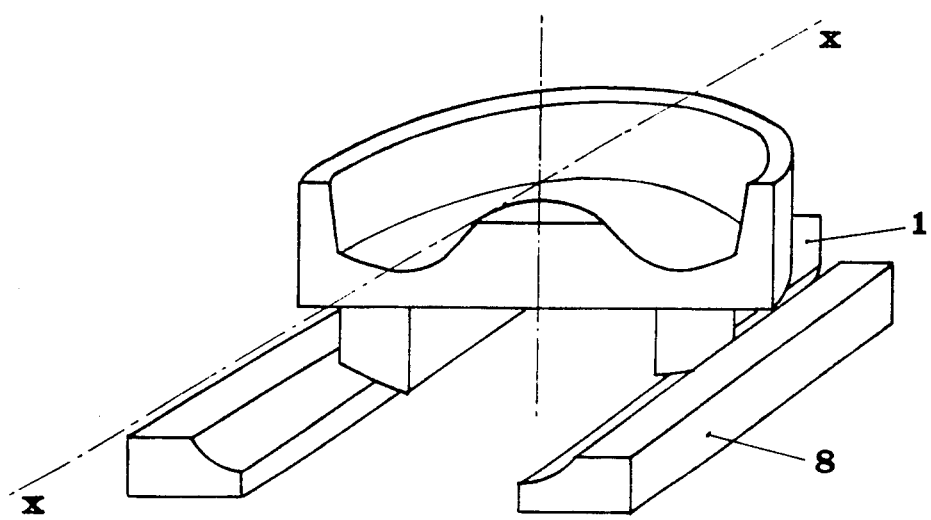
FIG. 6 shows a perspective view of a first form of the device according to the invention.

A perspective view of the longitudinal members just described are seen in the whole assembly of FIG. 6. Obviously, in this embodiment of the invention, the only shifting per mitted between the lower portion of the mold and the supporting longitudinal members, is a rotation about the axis X—X.

Figure 7:
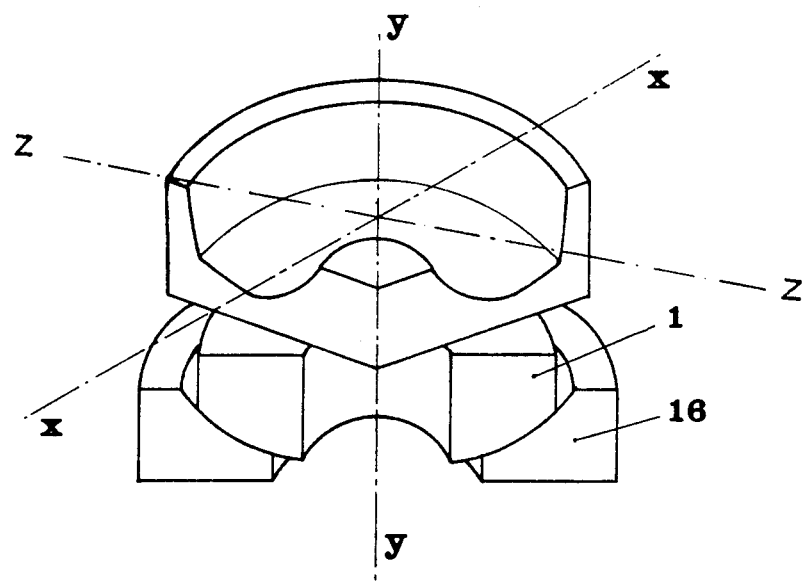
FIG. 7 shows a perspective view of a second form of the device according to the invention.

In a variation of the machine of the invention, the pair of supporting elements in correspondence to each table is substituted by a single annular supporting element 16, that is coaxial with the axis of the mold, wherein the above concave and cylindrical surface now becomes a concave portion of the spherical cap. The above element, which shall be called a drum is indicated and shown in a perspective view in FIG. 7.

Correspondingly, also the convex, cylindrical surface made on the tables, transforms into a convex surface, constituted by a portion of the spherical cap coupled with the concave surface of the annular supporting element that is fixed on the frame. In this form of realization of the invention, rotation is possible (see FIG. 7) both, about the axis X—X and about the axis Y—Y, as well as about the axis Z—Z, with the fact always holding good as to the meeting-point of the three axes remaining stationary with respect to the plane III—III.

Figure 4:
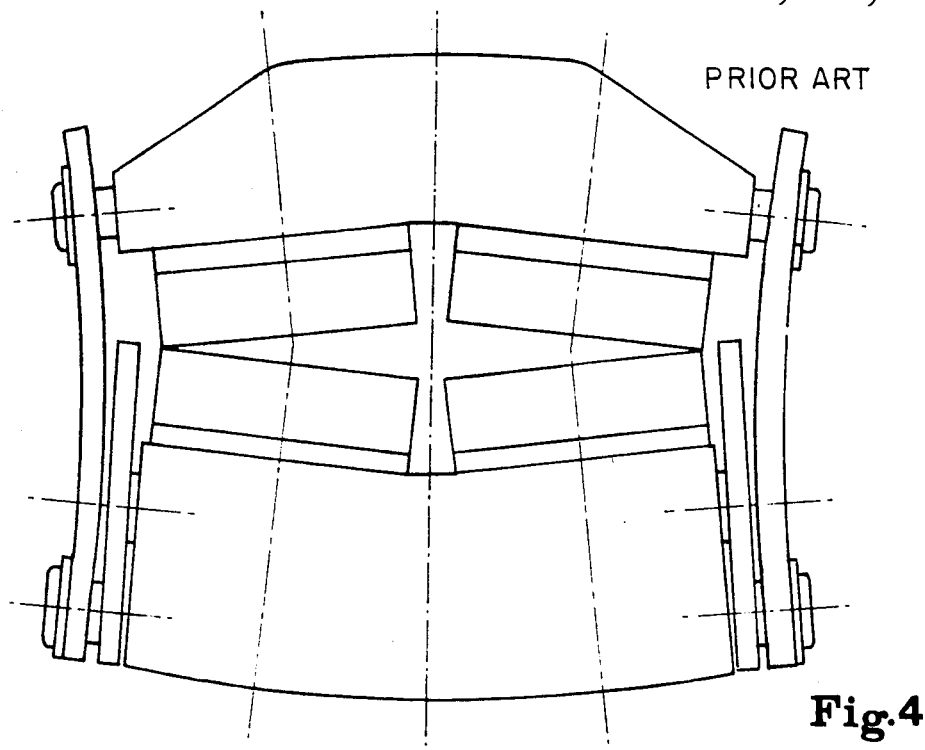
FIG. 4 shows a general schematic assembly of a known machine, in a state of deformation during the vulcanizing cycle.
Figure 5:
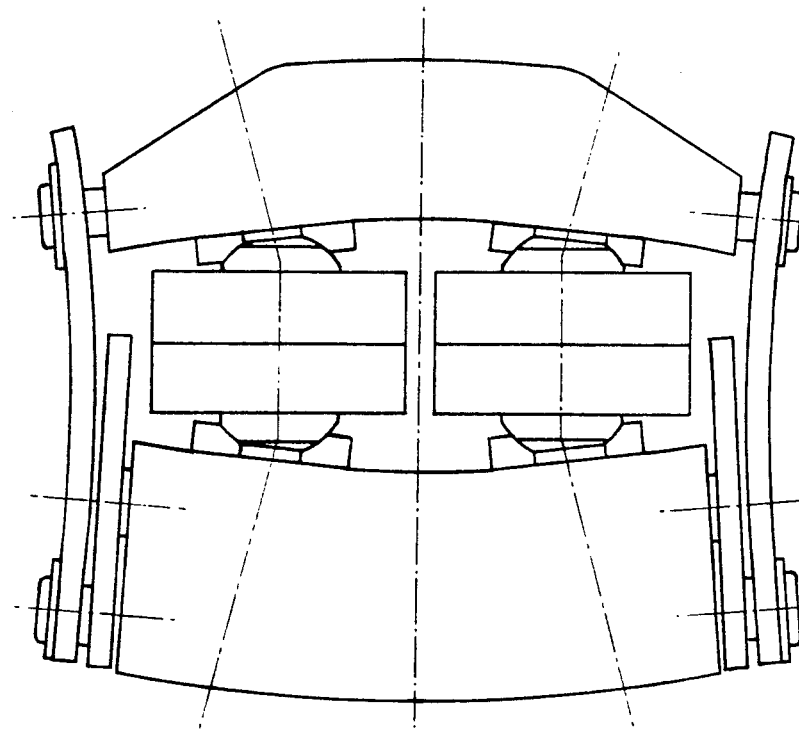
FIG. 5 shows a general schematic assembly of the machine according to the invention in a state of deformation during the vulcanizing cycle.

Under the combined effect of the thrusts directed downward towards the base, exercised at the extremity of the beam, and the counter-thrusts exercised by the mold at two intermediate points at the above extremities, the beam bends upwardly assuming a curve which cavity is turned downwards, symmetrically with respect to the mid-plane of the press, orthogonal to the plane of symmetry III—III, and passing through the two molds, as shown in FIGS. 4 and 5 in an obviously exaggerated way, for the scope of illustrating this phenomenon with the maximum clarity.

Contrary to what was expressed in the known devices (FIG. 4) where the tables were integrated respectively with the beam and with the base, in the invention press, the bending of the above beam is no longer able to cause any off-setting between the two half-molds, both lower and upper, of each mold, while having the consequent unbalanced distribution of the pressures along the edges of the mold, since the mold-table complex can move and, in particular, rotate with respect to the beam (FIG. 5), and hence automatically re-establish, through this rotation, the balance and the uniformity of the pressures along the contacting edge between the upper and the lower sections of the mold. Therefore, the mold results as having been charged with a pressure that is directed exclusively in the axial sense and hence, it remains centered and completely closed, behaving in a manner that is quite similar to that of the molds mounted on the single presses, i.e. those having a single molding place.

The invention being thus described, it will be obvius that the same may be varied in many ways. Such variations are not to be regarded as a departure from the spirit and scope of the invention, and all such modifications as would be obvious to one skilled in the art are intended to be included within the scope of the following claims.

What is claimed is:

1. A molding and/or vulcanizing press that is provided with two adjacent sites for containing two corresponding vulcanizing molds, each mold comprising at least two opposite sections, a lower and an upper section respectively, that are reciprocally shiftable axially, defining a cavity inside which a product is molded and/or vulcanized, with each section being mounted on corresponding upper and lower tables, said press comprising a frame including a base, provided with two housing seats for said lower tables, a beam to which said upper tables are connected, two shoulders connecting said beam to said base through fixtures that allow for shifting of said beam with respect to said base for realizing at least the opening and shutting of said molds and for exercising a thrust upon each pair of opposed sections, sufficient for keeping said molds shut by contrasting the pressure acting inside said molds during each working cycle, and support means for coupling said molds to said press, said support means being respectively integral with said beam and said base and interposed between said beam and said upper table and between said base and said lower table, said support means being provided with coupling surfaces for coupling with corresponding matching surfaces provided on said tables, said upper and lower tables being mounted on said frame, freely shiftable with respect to said beam and base, said coupling surfaces of said support means being shaped so as to allow relative shifting of each closed and pressurized mold, with respect to said frame.

2. The press according to claim 1, wherein said coupling surfaces are concave surfaces that allow at least the rotation of each table with respect to said frame about an axis perpendicular to the axis of said corresponding mold and to the plane of symmetry containing the axis of both molds.

3. The press according to claim 2, wherein said coupling surfaces are concave surfaces whose intersections with said plane of symmetry are arcs of a circle having a perpendicular to a corresponding chord inclined with respect to the mold axis according to an angle of from 20° to 40°.

4. The press according to claim 1, wherein said supporting means comprises in correspondence with each table, a pair of longitudinal members mounted integrally with respect to said beam and said base, perpendicular to said plane of symmetry, symmetrically disposed with respect to the axis of each corresponding mold, each longitudinal member being provided with a concave coupling surface for coupling with a corresponding convex surface on said table.

5. The press according to claim 4, wherein each respective concave surface is a cylindrical surface having its generatrix parallel to the longitudinal direction of said corresponding longitudinal member.

6. The press according to claim 5, wherein each cylindrical surface of said support means comprises a surface portion of a distinct coaxial cylinder.

7. The press according to claim 6, wherein each cylindrical surface consists of four surface portions of the same cylinder.

8. The press according to claim 1, wherein said support means for coupling comprises, for each table, a drum coaxial with a corresponding annular section provided on said table, said drum being provided with a concave surface comprising an inner surface of a spherical cap that couples with a corresponding convex spherical cap provided on said table.

* * * * *